United States Patent
Isozumi et al.

(10) Patent No.: US 7,896,112 B2
(45) Date of Patent: Mar. 1, 2011

(54) SUPPLEMENTARY SUPPORT STRUCTURE FOR ROBOT

(75) Inventors: Takakatsu Isozumi, Tokyo (JP); Masakazu Ishizaki, Tokyo (JP); Tadaaki Osawa, Tokyo (JP); Kazuhiko Akachi, Tokyo (JP); Kenji Kaneko, Tsukuba (JP); Fumio Kanehiro, Tsukuba (JP); Kiyoshi Fujiwara, Tsukuba (JP)

(73) Assignee: Kawada Industries, Inc., Tokyo (JP)

( * ) Notice: Subject to any disclaimer, the term of this patent is extended or adjusted under 35 U.S.C. 154(b) by 560 days.

(21) Appl. No.: 10/513,827

(22) PCT Filed: May 7, 2003

(86) PCT No.: PCT/JP03/05699

§ 371 (c)(1), (2), (4) Date: Jul. 1, 2005

(87) PCT Pub. No.: WO03/095156

PCT Pub. Date: Nov. 20, 2003

(65) Prior Publication Data

US 2006/0011391 A1    Jan. 19, 2006

(30) Foreign Application Priority Data

May 10, 2002    (JP)    ............... 2002-136029

(51) Int. Cl.
   *B62D 51/06*    (2006.01)
(52) U.S. Cl. ............... 180/8.5; 180/8.1; 180/8.6; 901/28
(58) Field of Classification Search ........... 180/8.1–8.6; 901/1, 15, 28; 318/568.12, 568.2; 218/568.12
See application file for complete search history.

(56) References Cited

U.S. PATENT DOCUMENTS

| | | | | | |
|---|---|---|---|---|---|
| 2,553,830 | A | * | 5/1951 | Motis | ............. 623/60 |
| 2,914,127 | A | * | 11/1959 | Ricouard | ......... 180/8.5 |
| 2,918,738 | A | * | 12/1959 | Barr | ............ 37/347 |
| 4,462,476 | A | * | 7/1984 | Shkolnik | ......... 180/8.6 |

(Continued)

FOREIGN PATENT DOCUMENTS

JP    A 5-285864    11/1993

(Continued)

*Primary Examiner*—Joanne Silbermann
*Assistant Examiner*—Maurice Williams
(74) *Attorney, Agent, or Firm*—Oliff & Berridge, PLC

(57) ABSTRACT

A supplementary support structure, which supports the body of a robot (1), comprises a contact component (7) which is disposed in a part near a joint (2c) on the distal end, having a hand (3) disposed thereon, of an arm (2) of the robot (1) so as to come into contact with a surface on which the robot (1) is supported, such as a floor surface, and a member which lies between the part having the contact component (7) disposed therein and the proximal end of the arm (2). Thus, the supplementary support structure can avoid an increase in the weight of the hand resulting from the support structure, thus eliminate an extra load on a driving system for the hand or the arm, and thus achieve the simplification and size reduction of the driving system. Moreover, the support structure can increase the degree of freedom of the shape or functional design of the hand and thus improve the functioning of the robot.

4 Claims, 10 Drawing Sheets

U.S. PATENT DOCUMENTS

| | | | | |
|---|---|---|---|---|
| 4,834,200 | A * | 5/1989 | Kajita | 180/8.1 |
| 5,255,753 | A * | 10/1993 | Nishikawa et al. | 180/8.6 |
| 5,455,497 | A * | 10/1995 | Hirose et al. | 318/568.12 |
| 6,377,014 | B1 * | 4/2002 | Gomi et al. | 318/568.12 |
| 6,401,846 | B1 * | 6/2002 | Takenaka et al. | 180/8.6 |
| 6,463,356 | B1 * | 10/2002 | Hattori et al. | 700/245 |
| 6,526,331 | B2 * | 2/2003 | Hirose | 700/245 |
| 6,532,400 | B1 * | 3/2003 | Jacobs | 700/245 |
| 6,580,970 | B2 * | 6/2003 | Matsuda et al. | 700/245 |
| 6,741,911 | B2 * | 5/2004 | Simmons | 700/245 |
| 6,981,562 | B2 * | 1/2006 | Takahashi | 180/8.6 |
| 7,143,850 | B2 * | 12/2006 | Takenaka et al. | 180/8.6 |
| 7,228,923 | B2 * | 6/2007 | Takenaka et al. | 180/8.6 |
| 7,249,640 | B2 * | 7/2007 | Horchler et al. | 180/8.6 |
| 2004/0027086 | A1 * | 2/2004 | Ogawa et al. | 318/568.12 |
| 2004/0238240 | A1 * | 12/2004 | Hirose et al. | 180/8.1 |
| 2005/0126833 | A1 * | 6/2005 | Takenaka et al. | 180/8.1 |

FOREIGN PATENT DOCUMENTS

| | | |
|---|---|---|
| JP | A 5-293776 | 11/1993 |
| JP | A 2001-62760 | 3/2001 |
| JP | A 2001-138271 | 5/2001 |
| JP | A 2001-239479 | 9/2001 |
| JP | A 2002-361575 | 12/2002 |
| JP | A 2004-1101 | 1/2004 |

* cited by examiner

SUPPLEMENTARY SUPPORT STRUCTURE FOR ROBOT

TECHNICAL FIELD

The present invention relates to a supplementary support structure which is provided in addition to a support structure which supports the body of a robot, such as the legs and feet or wheels thereof, so as to support the body of the robot when the robot falls down or stands up or in other situations.

BACKGROUND ART

Generally, a robot such as a humanoid robot has arms, each of which has a hand, such as a gripper for gripping an object or a tool for performing work or processing, on its distal end. Heretofore, when the robot falls down or stands up, the hands of the robot come into contact with a surface on which the robot is supported, such as a floor or ground surface, and the hands in contact with the surface support the body of the robot in cooperation with the arms of the robot. In the conventional robot, the hand and arm therefore function as a supplementary support structure.

However, the above-mentioned conventional supplementary support structure must be configured so that the hand has higher strength than functionally required or has a protective component for its sensor in order to avoid impairment of the functioning of the hand for gripping an object or performing work or processing. This support structure has the problem of increasing the weight of the hand and thus imposing an extra load on a driving system for the hand or arm, and also has the problem of reducing the degree of freedom of the shape or functional design of the hand.

DISCLOSURE OF THE INVENTION

It is an object of the present invention to provide a support structure designed advantageously to overcome the foregoing problems. A supplementary support structure for robot of the invention, which supports the body of a robot, comprises a contact component which is disposed in a part near a joint on the distal end or midpoint of an arm of the robot or in a part near a joint on the midpoint of a leg of the robot so as to come into contact with a surface on which the robot is supported, and a member which lies between the part having the contact component disposed therein and the proximal end of the arm or the leg.

With the supplementary support structure for robot of the present invention, the robot acts as described below when falling down. The robot stretches the arms or legs out in the direction in which the robot falls down. The robot also actuates the joints near the contact components, thereby bending and moving the hands each located closer to the distal end with respect to the joint, or the arm or leg members each located closer to the distal end, in the direction away from the surface on which the robot is supported, such as a floor or ground surface. Thus, the contact components come into contact with the surface such as the floor or ground surface, so that the wrists, elbows or knees of the robot are put on the surface. In this way, the contact components in contact with the surface support the body of the robot in cooperation with the arm or leg members, each of which lies between the part having the contact component disposed therein and the proximal end of the arm or the leg. When standing up after the falling down, the robot in a supported state with the support structure raises itself by actuating the legs and feet or other means.

The robot acts as described below, when the robot tilts its body to perform work or processing, specifically when a tilt angle is greater than an angle at which the robot can support itself. The robot stretches the arms or legs out in the direction in which the robot tilts its body. The robot also actuates the joints near the contact components, thereby bending and moving the hands each located closer to the distal end with respect to the joint, or the arm or leg members each located closer to the distal end, in the direction away from a surface on which the robot is supported, such as a wall surface or a side surface of a table. Thus, the contact components come into contact with the surface such as the wall surface or the side surface of the table, so that the wrists, elbows or knees are put on the surface. In this way, the contact components in contact with the surface support the body of the robot in cooperation with the arm members, each of which lies between the joint near the contact component and the proximal end of the arm. When standing up after the tilting, the robot in a supported state with the support structure raises itself by actuating the legs and feet or other means.

Therefore, the supplementary support structure for robot of the present invention can achieve the functioning of the hand without the need for the hand to have higher strength than functionally required or have a protective component for its sensor. Thus, the support structure of the present invention can avoid an increase in the weight of the hand, thus eliminate an extra load on a driving system for the hand or the arm, and thus achieve the simplification and size reduction of the driving system. Moreover, the support structure of the present invention can increase the degree of freedom of the shape or functional design of the hand and thus improve the functioning of the robot.

It should be noted that, in the supplementary support structure for robot of the present invention, it is preferable that the contact component be disposed in the part near the joint on the distal end of the arm. When the contact component is disposed in the part near the joint on the distal end of the arm, this configuration allows reducing a distance which the body falls until the contact components come into contact with the surface on which the robot is supported, thus reducing impact force, and thus reducing the occurrence of an increase in the weight of the support structure resulting from an increase in the stiffness of the support structure.

In addition, in the supplementary support structure for robot of the present invention, it is preferable that the contact component include a non-slip component. When the contact component includes the non-slip component, there is the following advantage. When the robot stands up after falling down or tilting its body at a great angle, the contact component can prevent itself from slipping on the surface on which the robot is supported. Thus, the contact components can facilitate standing action using the legs in conjunction with the arms.

Preferably, the supplementary support structure for robot of the present invention comprises shock-absorbing means. When the support structure comprises the shock-absorbing means, there is the following advantage. When the robot falls down or in other situations, the support structure can absorb impact force and thus prevent damage to the parts of the body of the robot.

PREFERRED MODE OF THE INVENTION

Figure 1:
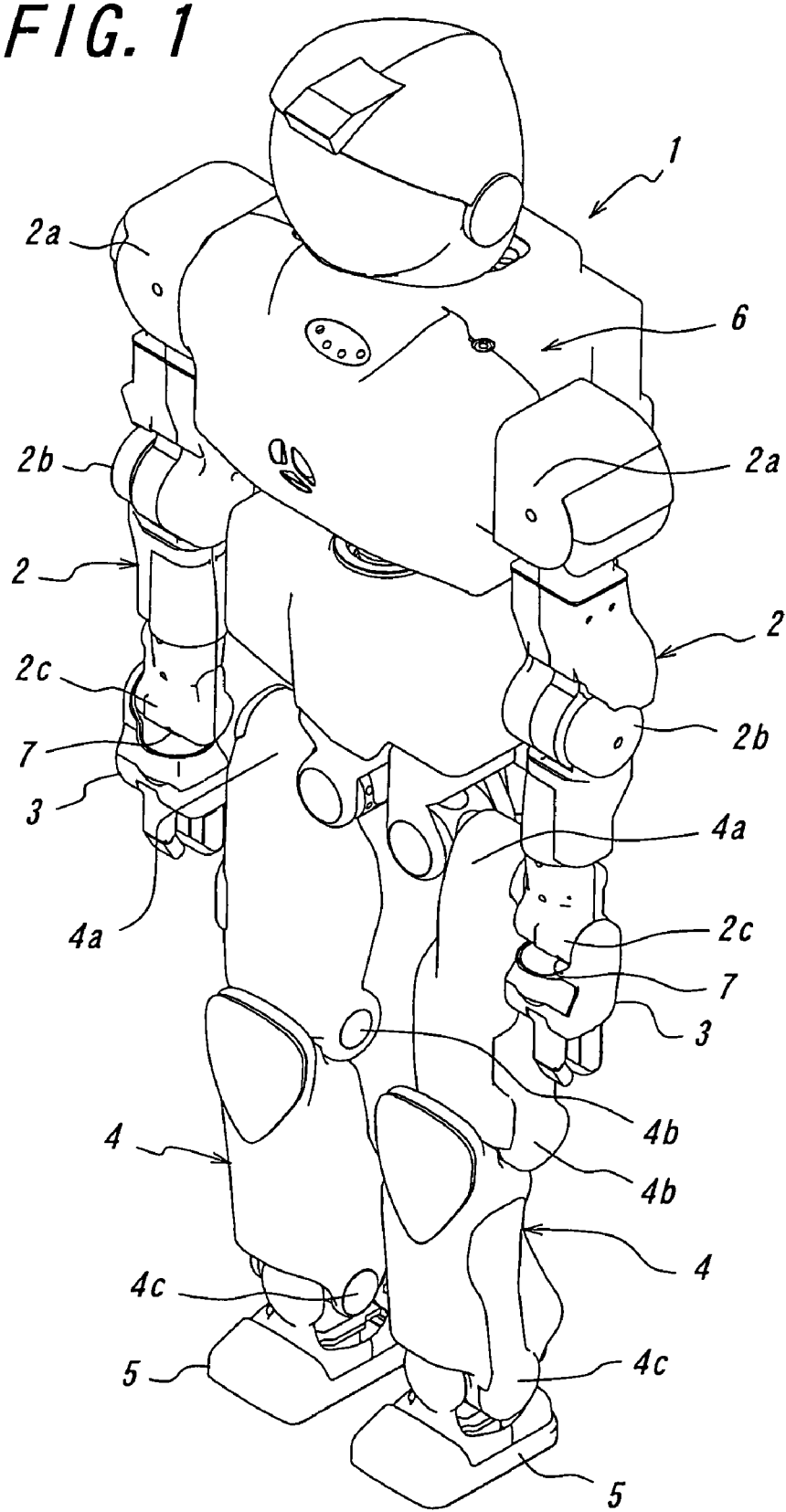
FIG. 1 is a perspective view showing a robot including a supplementary support structure for robot according to one embodiment of the present invention.
Figure 2A:
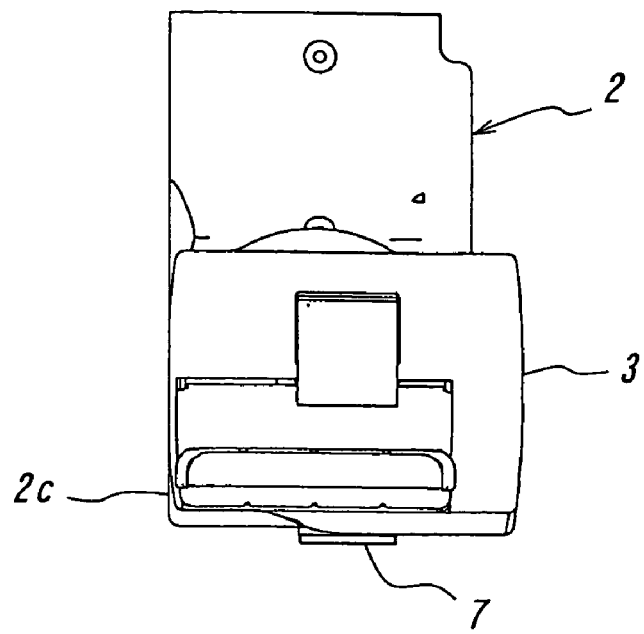
FIGS. 2A and 2B are a front view and a side view, respectively, showing the supplementary support structure for robot according to the embodiment, which is disposed on the distal end of an arm of the robot, in conjunction with a hand and a wrist as bent.
Figure 2B:
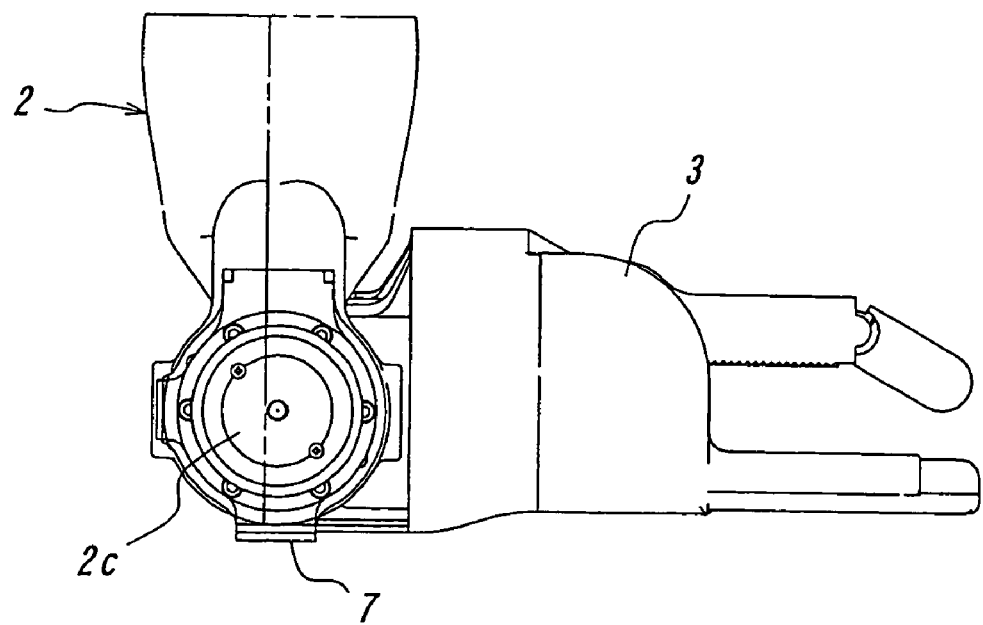
Figure 3:
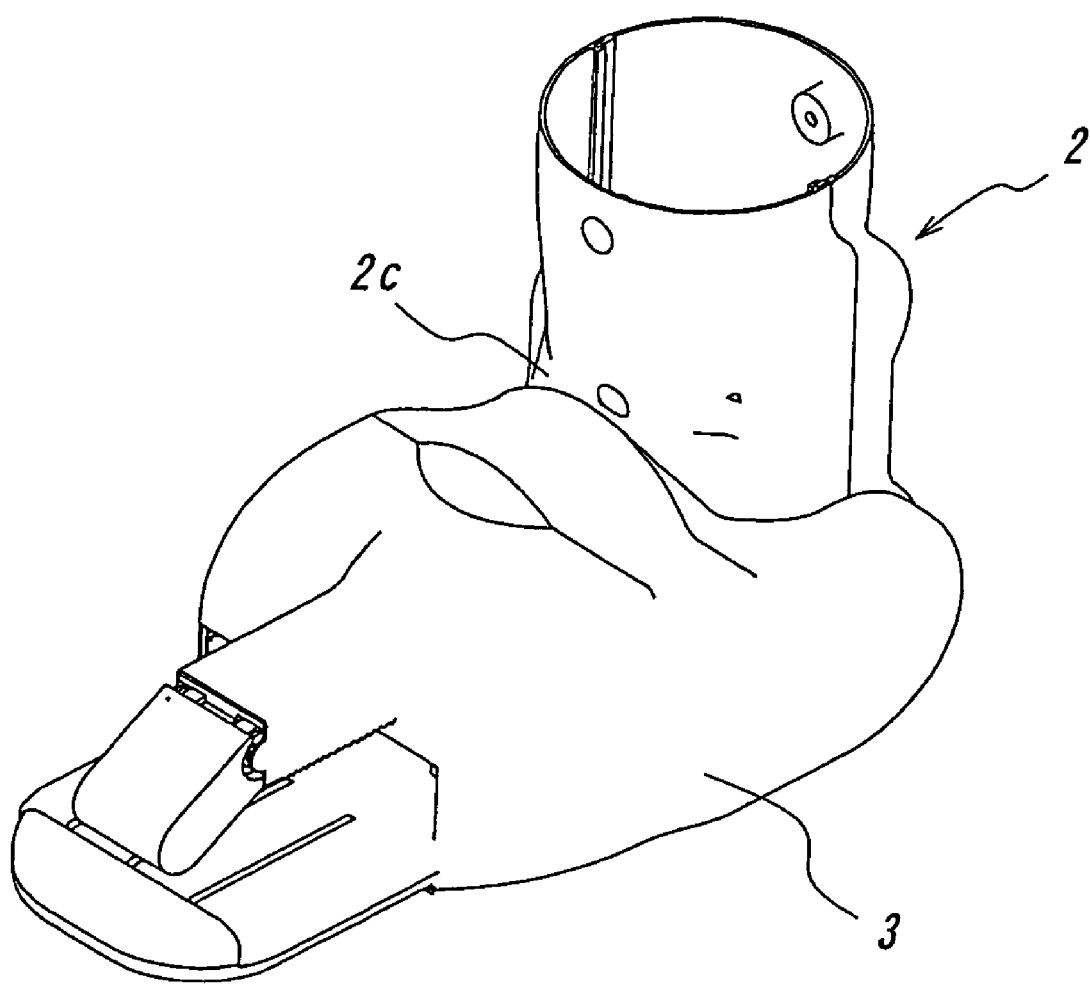
FIG. 3 is a perspective view showing the distal end of the arm of the robot in conjunction with the hand and the wrist as bent.
Figure 4:
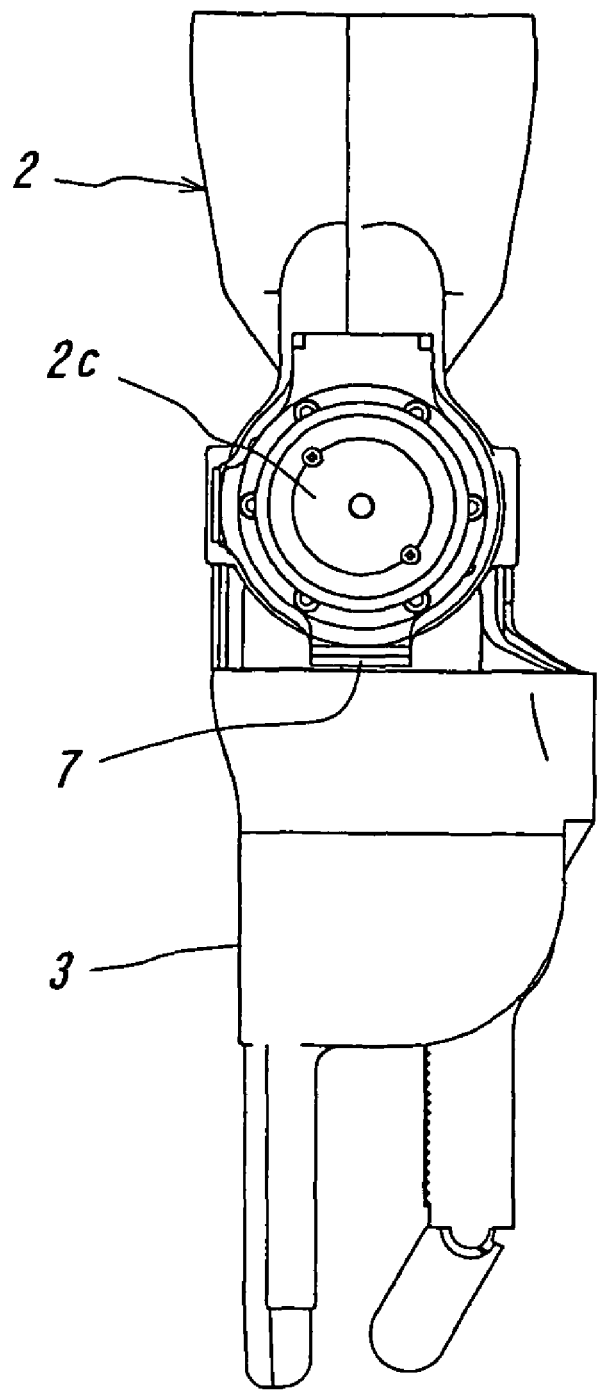
FIG. 4 is a side view showing the supplementary support structure for robot according to the embodiment, which is disposed on the distal end of the arm of the robot, in conjunction with the hand and the wrist as unbent.
Figure 5:
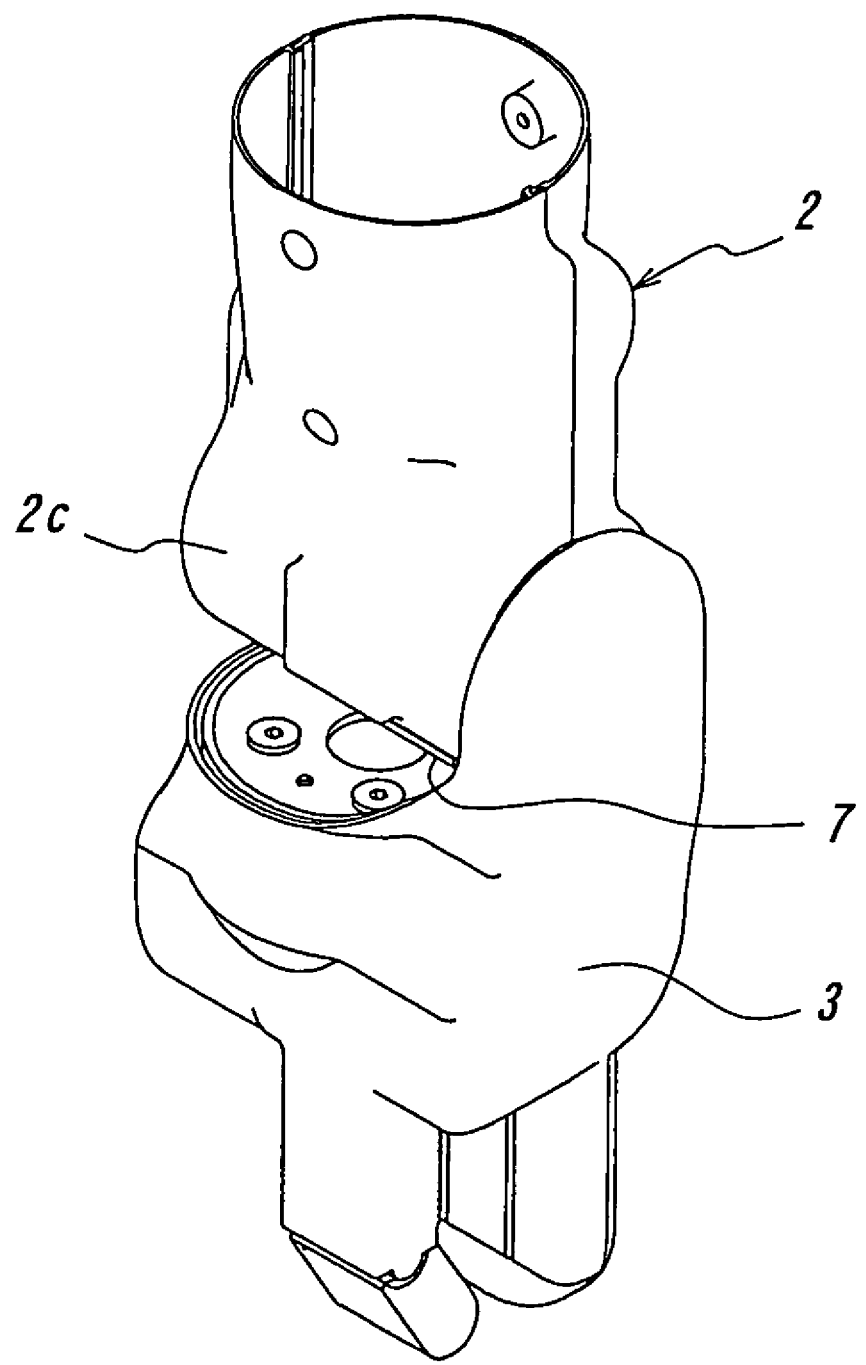
FIG. 5 is a perspective view showing the distal end of the arm of the robot in conjunction with the hand and the wrist as unbent.

An embodiment of the present invention will be described in detail below by means of an example with reference to the drawings. Here, FIG. 1 is a perspective view showing a robot including a supplementary support structure for robot according to one embodiment of the invention. FIGS. 2A and 2B are a front view and a side view, respectively, showing the supplementary support structure for robot according to the embodiment, which is disposed on the distal end of an arm of the robot, in conjunction with a hand and a wrist as bent. FIG. 3 is a perspective view showing the distal end of the arm of the robot in conjunction with the hand and the wrist as bent. FIG. 4 is a side view showing the supplementary support structure for robot according to the embodiment, which is disposed on the distal end of the arm of the robot, in conjunction with the hand and the wrist as unbent. FIG. 5 is a perspective view showing the distal end of the arm of the robot in conjunction with the hand and the wrist as unbent. In FIGS. 1 to 5, reference numeral 1 denotes the robot; reference numeral 2, the arm of the robot 1; reference numeral 3, the hand disposed on the distal end of the arm 2; reference numeral 4, a leg of the robot 1; reference numeral 5, a foot disposed on the distal end of the leg 4; reference numeral 6, a body of the robot 1; and reference numeral 7, a contact component of the supplementary support structure for robot according to the embodiment.

As shown in FIG. 1, the robot 1 has joints 2a, 2b, and 2c, which are disposed on the proximal end, midpoint, and distal end of the arm 2, respectively. The robot 1 also has joints 4a, 4b, and 4c, which are disposed on the proximal end, midpoint, and distal end of the leg 4, respectively. The hand 3 which functions as a gripper for gripping an object is coupled to the distal end of the arm 2 through the joint 2c. The foot 5 is coupled to the distal end of the leg 4 through the joint 4c. The proximal end of the arm 2 is coupled to a shoulder of the body 6 through the joint 2a. The proximal end of the leg 4 is coupled to a lumber part of the body 6 through the joint 4a. Each of the joints is provided with driving means which is adapted to allow each joint to rotate through at least one degree of freedom.

The supplementary support structure for robot according to the embodiment includes the contact component 7. As shown in FIGS. 2A and 2B, the contact component 7 is fixedly secured to a part which is located near the joint 2c on the distal end of each arm 2 and is located substantially on the axis of the arm 2, so that the contact component 7 acts as the structural component of the support structure. As shown in FIGS. 4 and 5, the contact component 7 is hidden by the hand 3 when the wrist is unbent.

In this embodiment, the contact component 7 is made of a rubber plate having tread in the form of narrow ridges. The contact component 7 also functions as a non-slip component utilizing the rubber plate having a high coefficient of friction. The contact component 7 also functions as shock-absorbing means utilizing the rubber plate having elastic properties.

Moreover, in the supplementary support structure for robot according to the embodiment, since the contact component 7 is disposed on the distal end of each arm 2, each arm 2 wholly acts as the structural component of the support structure.

Figure 6:
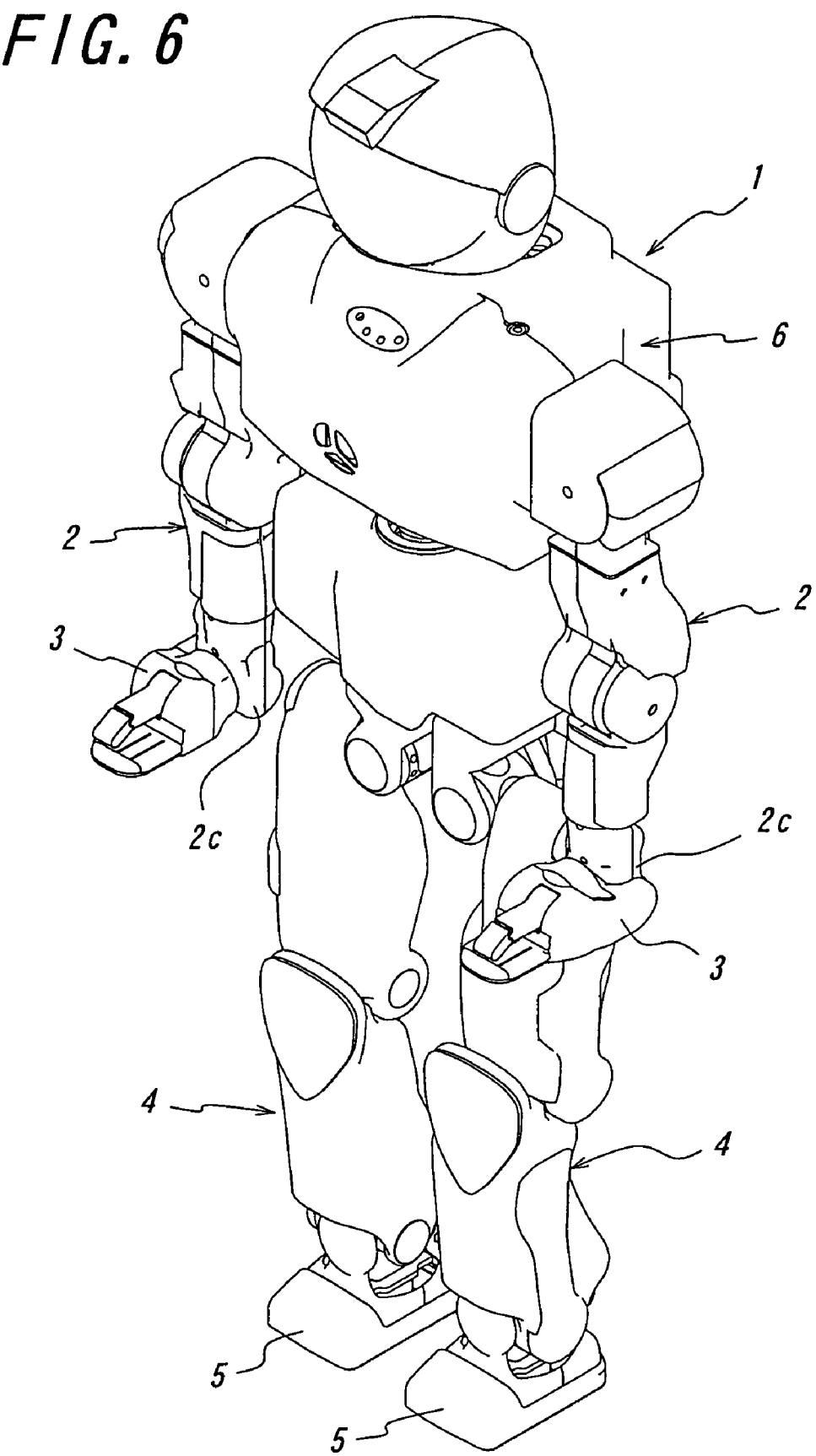
FIG. 6 is a perspective view showing a ready state of the supplementary support structure for robot, which is supplementary to the robot, according to the embodiment.
Figure 7:
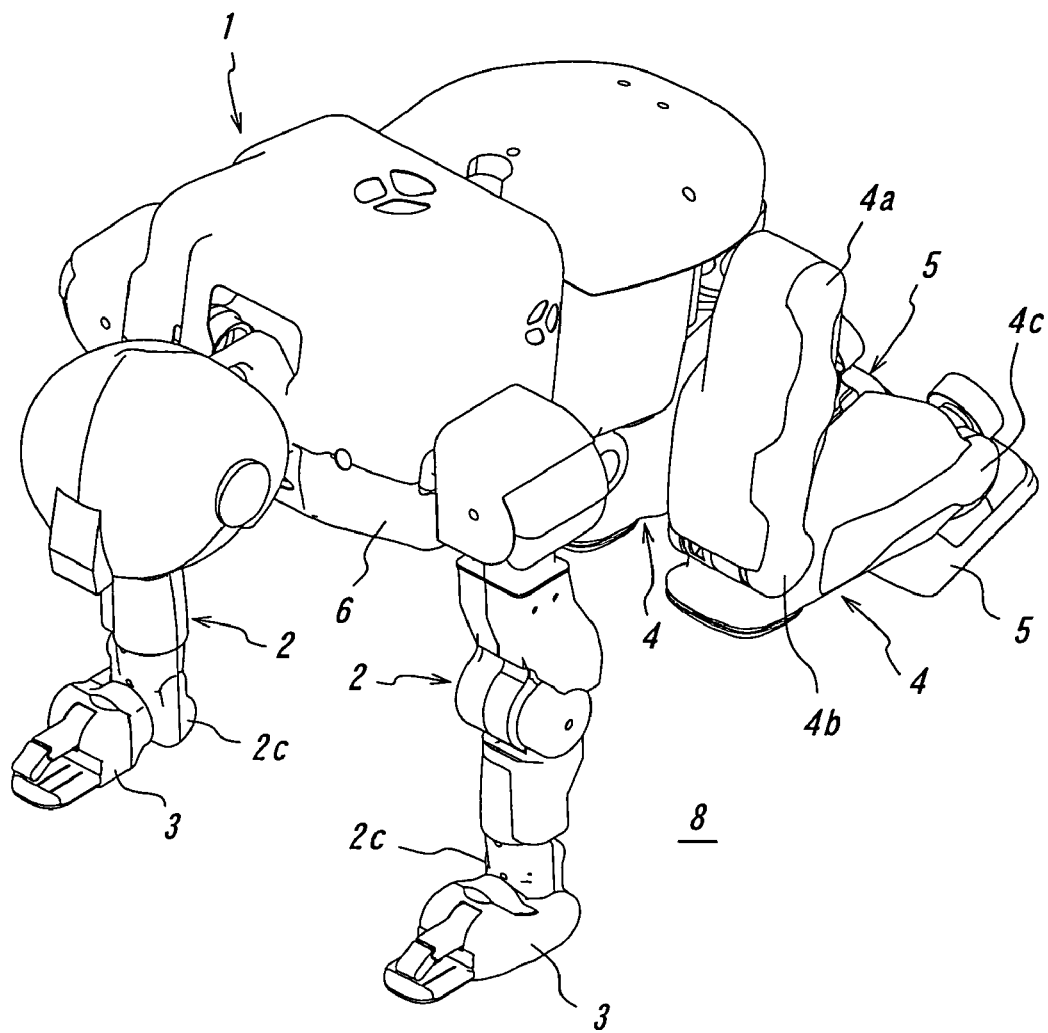
FIG. 7 is a perspective view showing a state of the supplementary support structure for robot, which is supplementary to the robot, according to the embodiment.
Figure 8:
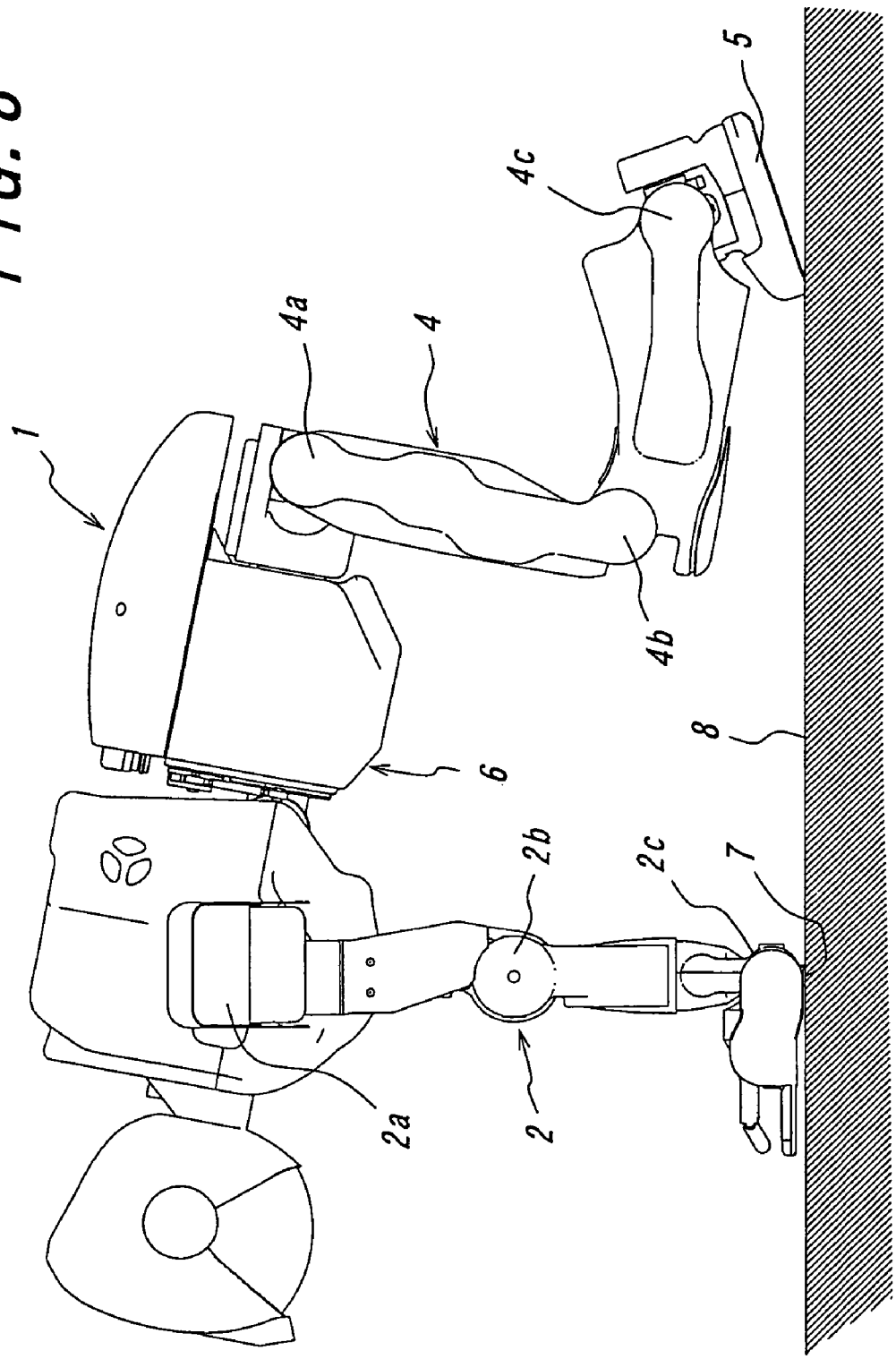
FIG. 8 is a side view showing the state of the supplementary support structure for robot, which is supplementary to the robot, according to the embodiment.
Figure 9:
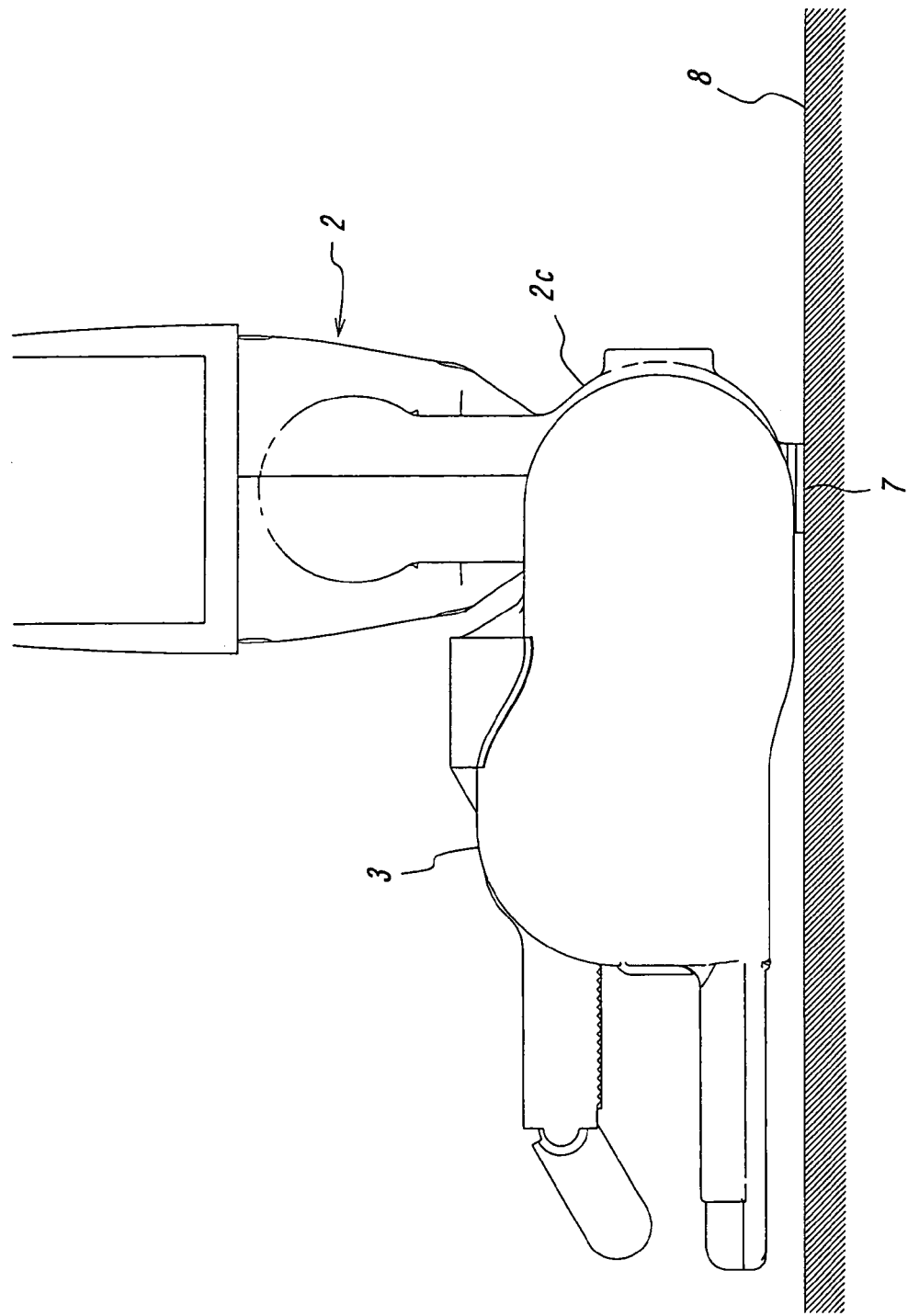
FIG. 9 is an enlarged illustrative view showing a contact component and its near vicinity shown in FIG. 8.

With the supplementary support structure for robot according to the embodiment, the robot 1 acts as described below when falling down. As shown in FIGS. 6 and 7, the robot 1 stretches the arms 2 out in the direction in which the robot 1 falls down. The robot 1 also actuates the joints 2c near the contact components 7, thereby bending and moving the hands 3, each of which is located closer to the distal end with respect to the joint 2c, in the direction away from a surface 8 on which the robot 1 is supported, such as a floor or ground surface. Thus, as shown in FIG. 8 and FIG. 9 illustrating, in enlarged view, the contact component 7 and its near vicinity shown in FIG. 8, the contact components 7 of the arms 2 come into contact with the surface 8 such as the floor or ground surface, so that the wrists are put on the surface 8. Thus, the contact components 7 in contact with the surface 8 support the body of the robot 1 in cooperation with the whole of the arms 2, each of which comprises an arm member which lies between the joint 2c near the contact component 7 and the proximal end of the arm 2.

Figure 10:
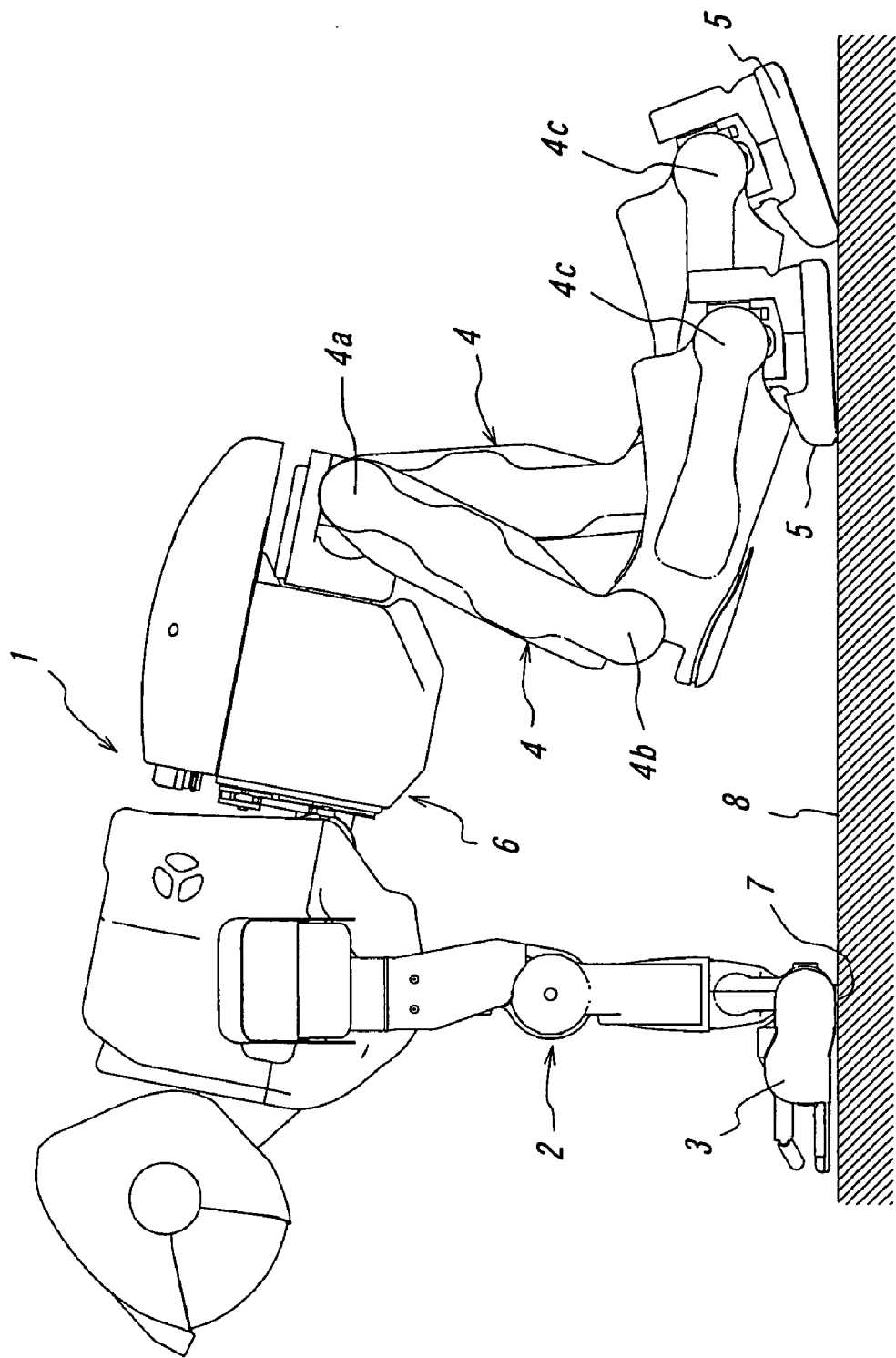
FIG. 10 is a side view showing a state in which the robot exists when standing up.

The robot 1 acts as described below when standing up after the falling down. As shown in FIG. 10, the robot 1 in a supported state with the support structure bends the legs 4 and the feet 5 by actuating the joints 4a to 4c. Then, the robot 1 raises itself by stretching the legs 4 and the feet 5 in front of the body 6.

Although not shown, the robot 1 acts as described below, for example when the robot 1 tilts its body to perform work or processing by the hands 3, specifically when a tilt angle is greater than an angle at which the robot 1 can support itself. The robot 1 stretches the arms 2 out in the direction in which the robot 1 tilts its body. The robot 1 also actuates the joints 2c near the contact components 7, thereby bending and moving the hands 3, each of which is located closer to the distal end with respect to the joint 2c, in the direction away from a surface on which the robot 1 is supported, such as a wall surface or a side surface of a table. Thus, the contact components 7 come into contact with the surface such as the wall surface or the side surface of the table, so that the wrists are put on the surface. Thus, the contact components 7 in contact with the surface support the body of the robot 1 in cooperation with the whole of the arms 2, each of which comprises the arm member which lies between the joint 2c near the contact component 7 and the proximal end of the arm 2. When standing up after the tilting, the robot 1 in a supported state with the support structure raises itself by actuating the legs 4 and the feet 5 in the same manner as above mentioned.

Therefore, the supplementary support structure for robot according to the embodiment can achieve the functioning of the hand 3 as the gripper without the need for the hand 3 to have higher strength than functionally required or have a protective component for its sensor such as a tactile sensor (not shown). Thus, the support structure of the embodiment can avoid an increase in the weight of the hand 3, thus eliminate an extra load on a driving system for the hand or the arm, and thus achieve the simplification and size reduction of the driving system. Moreover, the support structure of the embodiment can increase the degree of freedom of the shape or functional design of the hand 3 and thus improve the functioning of the robot 1.

In the supplementary support structure for robot according to the embodiment, the contact component 7 is disposed near the joint 2c on the distal end of the arm 2. Thus, the robot 1 stretches the arms 2 out in the direction in which the robot 1 falls down or tilts its body, so that there is a decrease in a distance which the body falls until the contact components 7 come into contact with the surface 8 on which the robot 1 is supported. The decrease in the distance leads to a decrease in impact force. Accordingly, this configuration allows reducing the occurrence of an increase in the weight of the support structure resulting from an increase in the stiffness of the support structure.

In the supplementary support structure for robot according to the embodiment, the contact component 7 also functions as the non-slip component. Accordingly, when the robot 1 stands up after falling down or tilting its body at a great angle, the contact component 7 can prevent itself from slipping on the surface 8 on which the robot 1 is supported. Thus, the contact components 7 can facilitate standing action using the legs 4 in conjunction with the arms 2.

In the supplementary support structure for robot according to the embodiment, the contact component 7 also functions as the shock-absorbing means. When the robot 1 falls down or in other situations, the contact component 7 can absorb impact force and thus prevent damage to the parts of the body of the robot 1.

Although the description has been given above with reference to illustrative examples, the present invention is not limited to the above-mentioned examples. For example, the contact component 7 may be disposed in a part near the joint 2b on the midpoint of the arm 2 or be disposed in a part near the joint 4b on the midpoint of the leg 4. In these cases, the appearance of the contact component 7 may take place by using the joint 2b to bend a part closer to the distal end with respect to the joint 2b of the arm 2 or may take place by using the joint 4b to bend a part closer to the distal end with respect to the joint 4b of the leg 4, as in the case of the above-mentioned embodiment in which the appearance of the contact component 7 takes place by bending the hand 3. Alternatively, the appearance of the contact component may take place by using appropriate open/close means to open a cover.

The hand 3 may function as a working or processing tool or may function otherwise. The non-slip component may be provided independently of the contact component. For example, the non-slip component may be disposed in the arm or the leg so as to be movable into and out of the arm or the leg. The shock-absorbing means may be provided independently of the contact component. For example, the shock-absorbing means may be disposed on the rear side of the contact component, the proximal end of the arm or the leg, or the like. The robot of the present invention may include an inherent support structure which does not comprise the legs and the feet but comprises wheels, crawlers, or the like.

INDUSTRIAL APPLICABILITY

The supplementary support structure for robot of the present invention can achieve the functioning of the hand without the need for the hand to have higher strength than functionally required or have a protective component for its sensor. Thus, the support structure of the invention can avoid an increase in the weight of the hand, thus eliminate an extra load on a driving system for the hand or the arm, and thus achieve the simplification and size reduction of the driving system. Moreover, the support structure of the invention can increase the degree of freedom of the shape or functional design of the hand and thus improve the functioning of the robot.

The invention claimed is:

1. A supplementary support structure for a robot, which supports a body of the robot, comprising:
    a contact component which is disposed in a joint located near a distal end or on a midpoint of an arm of the robot or in a joint on a midpoint of a leg of the robot, the contact component being located on a central longitudinal axis of the arm or leg of the robot so as to come into contact with a surface on which the robot is supported;
    a first part which lies between the joint having said contact component disposed therein and the proximal end of the arm or the leg near the body; and
    a second part which lies between the joint and a distal end of the arm or the leg,
    wherein the contact component is hidden in the joint and is not visible when viewed from an outer lateral side of the robot when the second part is not bent from the first part with the joint, and appears and protrudes from the joint when the second part is bent from the first part with the joint.

2. The supplementary support structure for a robot according to claim 1, wherein said contact component includes a non-slip component.

3. The supplementary support structure for a robot according to claim 1, wherein said contact component includes a shock-absorbing means.

4. The supplementary support structure for a robot according to claim 2, wherein said contact component includes a shock-absorbing means.

* * * * *